July 10, 1945.  A. T. KRENZIEN  2,380,181

FRONT WHEEL DRIVE FOR VEHICLES

Filed April 11, 1944  2 Sheets-Sheet 1

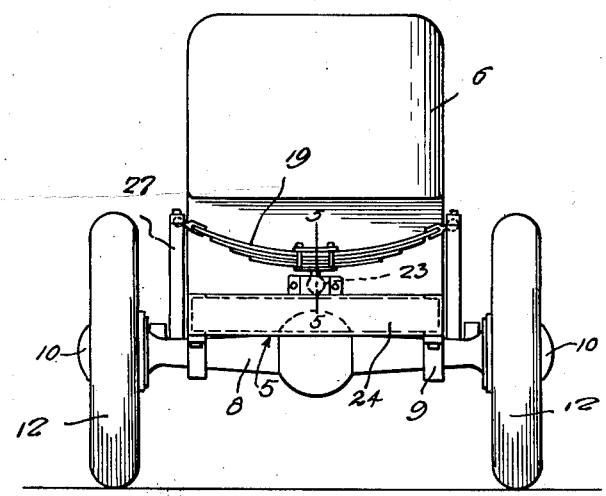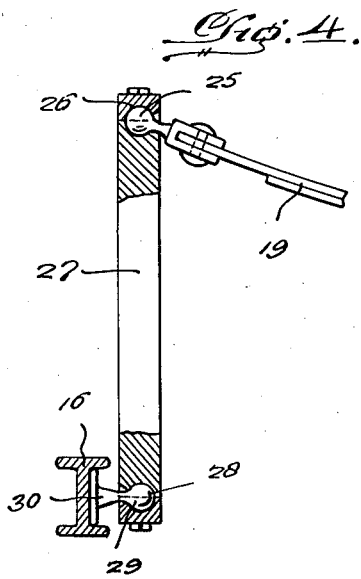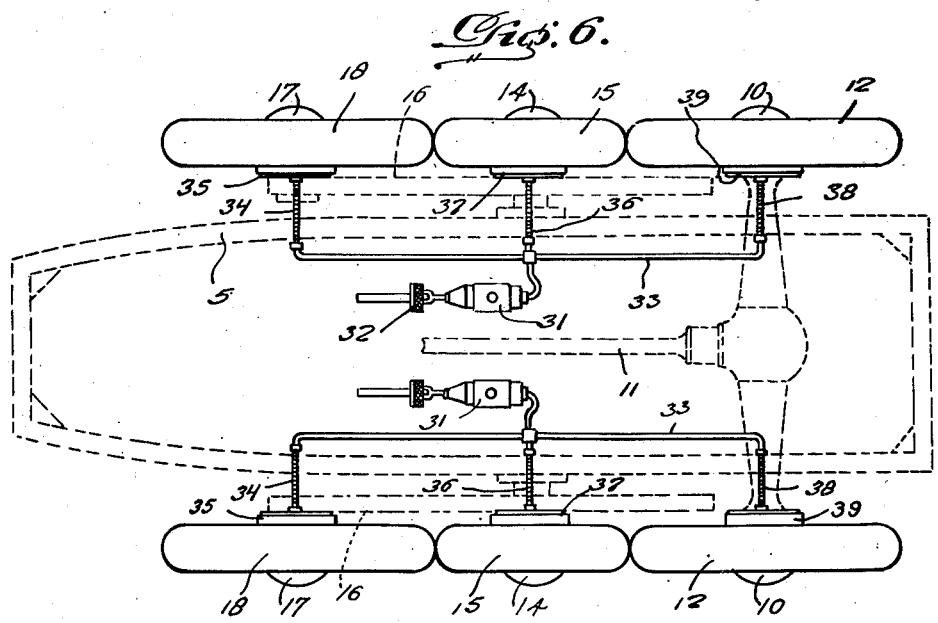

Patented July 10, 1945

2,380,181

UNITED STATES PATENT OFFICE 2,380,181

FRONT WHEEL DRIVE FOR VEHICLES

Alvin T. Krenzien, Norfolk, Nebr.

Application April 11, 1944, Serial No. 530,521

3 Claims. (Cl. 180—74)

The present invention relates to new and useful improvements in front wheel drives for tractors and other vehicles and has for its primary object to provide friction drive means between the rear wheels and front wheels to provide traction for all four wheels of the vehicle.

More specifically the invention comprises a vehicle having front and rear wheels, the rear wheels having direct driving engagement with the power plant and the front and rear heels being maintained in longitudinal alignment and providing an idler wheel between the front and rear wheels at each side of the vehicle in frictional engagement therewith to provide traction for the front wheels as well as for the rear wheels, the vehicle being steered by applying a braking force to the wheels at one side of the vehicle.

An important object of the present invention is to provide a friction drive mechanism between the front and rear wheels of the vehicle through the medium of an idler gear between the front and rear wheels and providing a spring biased pivotal mounting for the front wheels on the axis of the idler wheel.

A further object is to provide a drive mechanism of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part thereof, wherein like numerals refer to like parts throughout, and in which—

Figure 1 is a side elevational view.

Figure 2 is a top plan view with parts broken away and shown in section.

Figure 3 is a rear elevational view.

Figure 4 is an enlarged detail of one of the links providing a pivotal connection between the vehicle spring and one of the rocker arms for the front wheels and with parts broken away and shown in section.

Figure 5 is a sectional view taken substantially on a line 5—5 of Figure 3, and

Figure 6 is a top plan view of the vehicle chassis and showing the brake system for the wheels at each side of the vehicle.

Referring now to the drawings in detail wherein for the purpose of illustration I have disclosed a preferred embodiment of the invention, the numeral 5 designates the frame for the vehicle on which the body 6 is supported having the hood 7 at the front end thereof in which a conventional power plant is mounted.

A rear axle housing 8 is secured to the rear end of the frame by means of the saddle 9, the axle housing having the rear wheels 10 at the ends thereof and driven in the usual manner by the axle shaft (not shown) in the housing and the drive shaft 11 from the motor (not shown). The wheels 10 have pneumatic tires 12 mounted thereon.

An axle 13 extends transversely of the frame 5 forwardly of the rear axle housing 8 and said last named axle may also be secured to the frame in the same manner as the axle housing 8.

Freely mounted on the ends of the axle 13 are idler wheels 14 having pneumatic tires 15 mounted thereon with the threads of the tires 12 and 15 in frictional engagement and with the tires 15 supported in an elevated position out of contact with the ground.

Rocker arms 16 are pivotally mounted at approximately the middle thereof on the axle 13 at each side of the vehicle and inwardly of the wheels 14, the front ends of the arms 16 having wheels 17 freely mounted thereon and provided with pneumatic tires 18 with their treads likewise in frictional engagement with the tires 15. The tires 18 and wheels 17 constitute the front wheels of the vehicle, the wheels 14 and tires 15 providing a frictional drive for the front wheels from the rear wheels.

A leaf spring 19 extends transversely of the frame 5 adjacent the rear end thereof, the leaf spring having a stem 20 secured intermediate its ends by the clamping plates 21 (see Figure 5), the stem extending downwardly from the under side of the spring and formed at its lower end with a ball 22 swivelly mounted in a sectional socket 23 supported on a transverse frame member 24.

Balls 25 are also attached to the ends of the spring 19 and are swivelly mounted in split sockets 26 on the upper ends of vertical links 27 which also have split sockets 28 at their lower ends for swivelly receiving balls 29 attached to the rear ends of the rocker arms 16 by means of the stems 30 (see Figure 4).

A floating mounting is thus provided for the front wheels 17 which are held under the influence of the spring 19, the shock subjected to the front wheels while traveling over rough ground being taken up by the spring and this particular arrangement also obviously compensating for unevenness of the ground or surface on which the vehicle travels.

From the foregoing it will be apparent that a four wheel drive is provided for the vehicle by reason of the frictional engagement of the idler wheels 14 between the front wheels 17 and the rear driven wheels 12.

An individual hydraulic brake system is provided for the wheels at each side of the vehicle and includes a master brake cylinder 31 for each set of wheels and actuated by a foot pedal 32 (see Figures 2 and 6), the master cylinder having a pipe 33 connected thereto with a branch pipe 34 connected to the brake 35 of the front wheel, a branch pipe 36 connected to the brake 37 of the idler wheel and a branch pipe 38 connecting to the brake 39 of the rear wheel. A similar brake system is provided for the wheels at the opposite side of the vehicle and the vehicle may be steered by applying the brakes at one side or the other of the vehicle.

It is believed the details of construction, manner of operation and advantages of the device will be readily understood from the foregoing without further detailed explanation.

Having thus described the invention, what I claim is:

1. A motor driven vehicle comprising rear driven wheels one at each side of the vehicle, an axle extending transversely of the vehicle forwardly of the rear wheels, rocker arms pivotally mounted intermediate their ends on said axle and extending longitudinally at each side of the vehicle, front wheels mounted freely rotatable on the front ends of said arms, spring means connected supportedly to the rear ends of the arms, and idler wheels mounted freely rotatable on said transverse axle forwardly of the rear wheels and positioned in frictional engagement with said front and rear wheels.

2. A motor driven vehicle comprising rear driven wheels, an axle extending transversely of the vehicle forwardly of the rear wheels, rocker arms extending longitudinally at each side of the vehicle and pivotally mounted intermediate their ends on said transverse axle, front wheels mounted freely rotatable on the front ends of said longitudinal arms, a leaf spring swivelly mounted transversely of the vehicle at the longitudinal center of the vehicle, links providing a swivel connection between the ends of the spring and the rear ends of said longitudinal arms, and idler wheels mounted freely rotatable on said transverse axle and positioned in frictional engagement with said front and rear wheels.

3. A motor driven vehicle comprising rear driven wheels, one of said wheels at each side of the vehicle, idler wheels forwardly of the driven rear wheels and in frictional engagement therewith, a transverse support on the vehicle, said idler wheels being mounted freely rotatable on said transverse support, a spring biased rocker arm pivoted on said support at each side of the vehicle, and front wheels carried by the rocker arms, freely rotatable on the forward ends of said arms and maintained in frictional engagement with said idler wheels.

ALVIN T. KRENZIEN.